United States Patent
Sato et al.

(10) Patent No.: US 7,439,282 B2
(45) Date of Patent: Oct. 21, 2008

(54) STIMULI-RESPONSIVE COMPOSITION, AND IMAGE-FORMING METHOD AND APPARATUS USING THE COMPOSITION

(75) Inventors: Koichi Sato, Kanagawa (JP); Ikuo Nakazawa, Kanagawa (JP); Sakae Suda, Kanagawa (JP); Masayuki Ikegami, Kanagawa (JP); Sadahito Aoshima, Toyonaka (JP); Shinji Sugihara, Fukui (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 11/123,061

(22) Filed: May 6, 2005

(65) Prior Publication Data

US 2005/0209367 A1    Sep. 22, 2005

Related U.S. Application Data

(62) Division of application No. 10/212,082, filed on Aug. 6, 2002, now Pat. No. 7,067,590.

(30) Foreign Application Priority Data

| Aug. 7, 2001 | (JP) | 2001-239372 |
| May 30, 2002 | (JP) | 2002-157821 |

(51) Int. Cl.
    *C09D 11/00* (2006.01)
(52) U.S. Cl. .................. 523/160; 523/161; 526/332
(58) Field of Classification Search ................ 523/160, 523/161; 526/332
    See application file for complete search history.

(56) References Cited

U.S. PATENT DOCUMENTS

| 3,062,892 | A | 11/1962 | Schneider et al. |
| 3,761,438 | A | 9/1973 | Schultz ............... 260/29.6 R |
| 4,313,124 | A | 1/1982 | Hara ................ 346/140 R |
| 4,345,262 | A | 8/1982 | Shirato et al. ......... 346/140 R |
| 4,459,600 | A | 7/1984 | Sato et al. ............ 346/140 R |
| 4,463,359 | A | 7/1984 | Ayata et al. ............. 346/1.1 |
| 4,558,333 | A | 12/1985 | Sugitani et al. ........ 346/140 R |
| 4,723,129 | A | 2/1988 | Endo et al. ............. 346/1.1 |
| 4,740,796 | A | 4/1988 | Endo et al. ............. 346/1.1 |
| 5,085,698 | A | 2/1992 | Ma et al. ............... 106/20 |
| 5,145,518 | A | 9/1992 | Winnik et al. ........... 106/21 |
| 5,519,085 | A | * | 5/1996 | Ma et al. ............... 524/503 |
| 5,800,803 | A | 9/1998 | Mirajkar et al. .......... 424/54 |
| 5,849,219 | A | 12/1998 | De Laat et al. .......... 252/313 |
| 5,939,485 | A | 8/1999 | Bromberg et al. ........ 524/556 |
| 5,955,509 | A | 9/1999 | Webber et al. .......... 514/772.7 |
| 6,380,315 | B1 | 4/2002 | Fischer et al. ........... 525/256 |
| 6,412,934 | B1 | 7/2002 | Moriyama et al. ......... 347/96 |
| 6,486,213 | B1 | 11/2002 | Chen et al. ............ 514/772.1 |
| 6,538,049 | B1 | 3/2003 | Kappele et al. .......... 523/161 |
| 6,616,946 | B1 | 9/2003 | Meier et al. ........... 424/489 |
| 2002/0049261 | A1 | 4/2002 | Soga et al. ............ 523/160 |
| 2002/0186288 | A1 | 12/2002 | Nakazawa et al. ........ 347/100 |
| 2003/0153649 | A1 | 8/2003 | Bromberg .............. 523/160 |

FOREIGN PATENT DOCUMENTS

| EP | 0 556 649 A1 | 8/1993 |
| EP | 1 072 956 A2 | 1/2001 |
| EP | 1 184 427 A2 | 3/2002 |
| EP | 1 243 624 A1 | 9/2002 |
| JP | 59-123670 A | 7/1984 |
| JP | 59-138461 A | 8/1984 |
| JP | 64-63185 A | 3/1989 |
| JP | 7-53841 A | 2/1995 |
| JP | 08-0221 A | 1/1996 |
| JP | 8-216392 A | 8/1996 |
| JP | 9-169850 | 6/1997 |
| JP | 11-302345 A | 11/1999 |
| JP | 11-322866 A | 11/1999 |
| JP | 11-322942 A | 11/1999 |
| JP | 2003-89752 A | 3/2003 |

OTHER PUBLICATIONS

Sugihara et al., "Molecular Design of New Block Copolymers and Stimuli-Responsive Physical Generation," Polymer Preprints, Japan, vol. 49, No. 12, 3653-54 (2000).

Aoshima et al., "Synthesis of Gradient Copolymers by Living Cationic Polymerization and Their Specific Stimuli-Responsive Behavior in Aqueous Solutions," Polymer Preprints, Japan, vol. 49, No. 7, 1225-26 (2000).

\* cited by examiner

*Primary Examiner*—Edward J Cain
(74) *Attorney, Agent, or Firm*—Fitzpatrick, Cella, Harper & Scinto

(57) ABSTRACT

The present invention relates to a stimuli-responsive composition that comprises a polymer, a solvent and a substance having a predetermined function. One embodiment of the present invention is a composition comprising a block polymer, a solvent and a substance having a predetermined function. The present invention also relates to an ink composition containing the composition, an image-forming method and an image-forming apparatus using the composition, and a recording medium applying the composition. Further, the present invention relates to an ABC type block polymer compound wherein the polymer is an ABC type triblock polymer, and wherein at least one of the blocks in the triblock polymer changes in nature from solvophilic to solvophobic or from solvophobic to solvophilic in response to stimuli, and more preferably, the A component, then the B component, and finally the C component respond to the stimuli.

2 Claims, 1 Drawing Sheet

STIMULI-RESPONSIVE COMPOSITION, AND IMAGE-FORMING METHOD AND APPARATUS USING THE COMPOSITION

The present application is a divisional of application Ser. No. 10/212,082, filed Aug. 6, 2002 now U.S. Pat. No. 7,067,590 the entire content of which is incorporated herein by reference.

This application is based on Japanese Patent Application Nos. 2001-239372 filed Aug. 7, 2001 and 2002-157821 filed May 30, 2002, the contents of which are incorporated hereinto by reference.

BACKGROUND OF THE INVENTION

1. Field of the Invention

The present invention relates to a stimuli-responsive composition which contains a polymer, a solvent and a substance having a predetermined function, and which is usable for various functional materials. More particularly, the present invention relates to a composition which is an aqueous dispersion, and also relates to an image-forming material which is favorably usable for printers and displays, and a device, an image-forming method and an image-forming apparatus using it.

The present invention also relates to an ABC type triblock polymer compound which is an ABC type block polymer compound, and which comprises, as respective blocks, an A block which is solvent-phobic (hereinafter called solvophobic), a B block which changes in nature from solvent-philic (hereinafter called solvophilic) to solvophobic or from solvophobic to solvophilic in response to stimuli, and a C block which is solvophilic. More preferably, the invention relates to an ABC type triblock polymer compound in which each of the blocks changes in nature from solvophobic to solvophilic or from solvophilic to solvophobic in response to stimuli, and this change occurs sequentially, first in the A block, then in the B block, and finally in the C block.

2. Description of the Related Art

Among dispersion materials containing particulate solids, coloring materials, such as ink and toner, which contain colorants as particulate solids, have been widely known as functional materials. In recent years, digital printing techniques have advanced with marked momentum. Typical examples of the digital printing techniques are electrophotography and ink-jet technology. Their presence has drawn increased attention as image-forming techniques in the office and at home.

Of them, the ink-jet technology has great features, compactness and reduced power consumption, as a direct method of image-forming. In this technology, a high image quality has been achieved promptly because of a fine nozzle and so on. An example of the ink-jet technology is a so-called bubble jet (a registered trademark) method by which ink supplied from an ink tank is heated with a heater in the nozzle to cause film boiling, and the ink is ejected by the force of the film boiling to form an image on a recording medium. Another example is a method which involves vibrating a piezo element to eject ink from the nozzle. In these methods, further improvements are desired to counter bleeding or feathering. To realize these improvements, the use of pigment dispersion ink is under study (for example, U.S. Pat. No. 5,085,698), but a further improvement is desired.

SUMMARY OF THE INVENTION

The object of the present invention is to provide a stimuli-responsive composition containing a block polymer, a solvent and a coloring material, and a pigment dispersion ink material containing this composition. Particularly, the object of the invention is to provide a pigment dispersion ink composition comprising the composition in which the solvent is water and the coloring material is a pigment, the pigment dispersion ink composition being high in dispersion stability, improved over conventional ones in terms of bleeding and feathering, and having excellent fixing properties, and a pigment dispersion ink material containing the pigment dispersion ink composition.

Accordingly, the present invention includes the following aspects:

A first aspect of the present invention is a composition which contains a block polymer, a solvent, and a coloring material, and which forms a micelle, the composition undergoing a change from a first micelle state into a second micelle state different therefrom in response to stimuli.

In this composition, the change is preferably caused by a change in the nature of at least one of the blocks of the block polymer. The change in the nature of at least one of the blocks of the block polymer is preferably a change from a solvophobic property to a solvophilic property, a change from a solvophilic property to a solvophobic property, or a change in the degree of the solvophilic property of the block polymer. In the present invention, moreover, it is preferred that the above change is accompanied by a critical change in viscosity, is accompanied by a critical change in the radius of the micelle, or is accompanied by a change from sol to gel.

In the composition of the present invention, the solvent in the composition is preferably water or an aqueous solvent. In the present invention, therefore, the change in the nature of at least one of the blocks of the block polymer is preferably a change from a hydrophobic property to a hydrophilic property, a change from a hydrophilic property to a hydrophobic property, or a change in the degree of the hydrophilic property of the block polymer. In the present invention, moreover, the coloring material in the composition is preferably a pigment. More preferably, the coloring material is a color pigment.

Furthermore, the block polymer in the composition of the present invention is preferably an ABC type block polymer, and is preferably a polymer containing a polyvinyl ether structure. Particularly, the polyvinyl ether structure preferably has a repeating unit indicated below (the following general formula (1)).

General Formula (1)

where $R^1$ is selected from linear, branched or cyclic alkyl groups having 1 to 18 carbon atoms, or —(CH($R^2$)—CH($R^3$)—O)$_l$—$R^4$ or —(CH$_2$)$_m$—(O)$_n$—$R^4$; l and m are each independently selected from integers of 1 to 12, and n is 0 or 1; $R^2$ and $R^3$ are each independently H or CH$_3$; $R^4$ comprises H, a linear, branched or cyclic alkyl group having 1 to 6 carbon atoms, Ph, Pyr, Ph-Ph, Ph-Pyr, —CHO, —CH$_2$CHO, —CO—CH=CH$_2$, —CO—C(CH$_3$)=CH$_2$, or CH$_2$COOR$^5$, provided that when $R^4$ is other than hydrogen, the hydrogen on the carbon atom can be substituted by a linear or branched alkyl group having 1 to 4 carbon atoms, F, Cl or Br, and the carbon in the aromatic ring can be substituted by nitrogen; and $R^5$ is H or an alkyl group having 1 to 5 carbon atoms.

The composition of the present invention is responsive to stimuli. The stimuli are preferably selected from a temperature change, exposure to electromagnetic waves, a pH change, and a concentration change. The composition of the present invention responds to at least one of these stimuli, and thus changes in its micelle state.

The composition of the present invention is preferably such that the radius in the particle size of the micelle is 5 nm or more, but 100 nm or less.

Further, the present invention includes an ink composition which comprises the above-mentioned composition and in which a substance having a predetermined function is a pigment. The ink composition can be used preferably as an image-forming material.

The present invention also includes a stimuli-responsive ink composition for an ink-jet process containing stimuli-responsive ink.

A second aspect of the present invention is an image-forming method comprising imparting ink onto a recording medium to form an image thereon, wherein the ink is the stimuli-responsive ink composition of the present invention.

In the present invention, the stimuli-responsive ink composition may respond to a plurality of stimuli and change into a plurality of micelle states corresponding to the respective stimuli. Concretely, the stimuli-responsive ink composition may change in the micelle state in response to first stimuli and then further change to a different micelle state in response to second stimuli.

An embodiment of the image-forming method according to the present invention is to bring the stimuli-responsive ink composition into contact with a substance or composition, which gives stimuli to the ink composition, to fix the ink composition on a recording medium, thereby forming an image. It is particularly preferred in the image-forming method of the present invention that the substance or composition giving stimuli is an ink composition.

Another embodiment of the image-forming method according to the present invention is that the substance or composition giving stimuli is provided on the recording medium beforehand.

In the present invention, the image-forming method preferably applies thermal energy to the ink composition containing the composition of the present invention to eject the ink composition.

A third aspect of the present invention is an image-forming apparatus for making a recording by ejecting an ink composition from an ink ejection portion to impart the ink composition onto a recording medium, wherein the ink composition is the stimuli-responsive ink composition according to the present invention.

The image-forming apparatus of the present invention is preferably an apparatus having means for bringing the stimuli-responsive ink composition into contact with a substance or composition giving stimuli to the ink composition, wherein the ink composition is fixed on a recording medium as a result of this contact to form an image. Preferably, the substance or composition giving stimuli is an ink composition.

In the image-forming apparatus of the present invention, the substance or composition giving stimuli may be provided on the recording medium beforehand. The image-forming apparatus of the present invention, moreover, is preferably an apparatus capable of making a recording by applying thermal energy to ink to eject the ink.

A fourth aspect of the present invention relates to a recording medium for forming an image when ink is imparted thereto, especially the recording medium in which the ink is the stimuli-responsive ink composition according to the present invention and a substance or composition giving stimuli is provided on the recording medium beforehand.

A fifth aspect of the present invention relates to a composition which undergoes a reversible change in response to stimuli, and a device using the composition, the composition being the above-described composition according to the present invention.

A sixth aspect of the present invention relates to an ABC type triblock polymer compound which is an ABC type block polymer compound, and which comprises, as respective blocks, an A block which is solvophobic, a B block which changes in nature from solvophilic to solvophobic or from solvophobic to solvophilic in response to stimuli, and a C block which is solvophilic. More preferably, this aspect relates to an ABC type triblock polymer compound in which each of the blocks changes in nature from solvophobic to solvophilic or from solvophilic to solvophobic in response to stimuli, and this change occurs sequentially, first in the A block, then in the B block, and finally in the C block. In the present invention, the block polymer containing repeating units shown by the aforementioned general formula (1) is preferred, and the ABC type triblock polymer compound expressed by the structure of the following general formula (2) is more preferred.

General Formula (2)

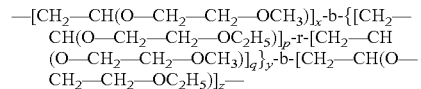

where x+y+z is 20 or more, but 40,000 or less, p and q are independently 0.01 or more, but 0.99 or less, p+q is 1, b represents a block structure, and r represents a random structure.

According to the present invention, a functional composition of good dispersibility, and an aqueous dispersion can be achieved. Moreover, the functional ink of the present invention, the image-forming method and apparatus using them can provide a printed image with excellent fixing properties. Furthermore, the present invention can obtain a novel ABC type triblock polymer compound in which the change from hydrophobic property to hydrophilic property or from hydrophilic property to hydrophobic property in response to stimuli occurs in the A block, then in the B block, and finally in the C block.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
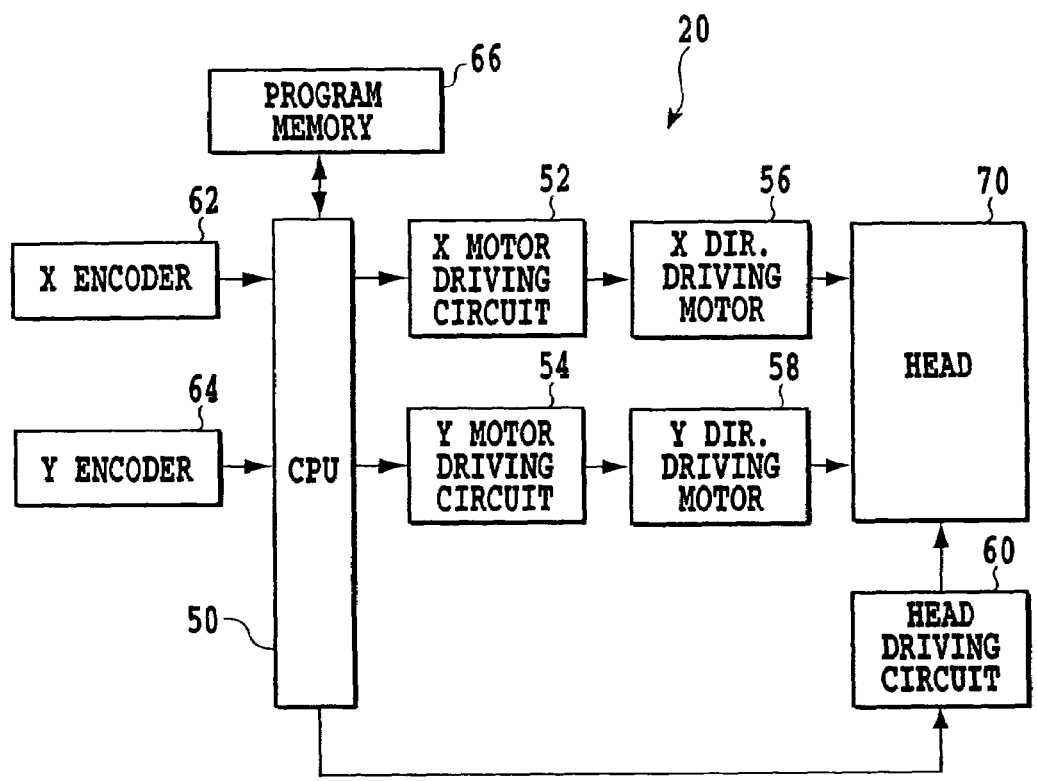
FIG. 1 is a block diagram showing the constitution of an ink-jet recorder.

The present invention will now be described in detail.

The first aspect of the present invention is a composition which contains a block polymer, a solvent, and a coloring material, and which forms a micelle, the composition undergoing a change from a first micelle state to a second micelle state different therefrom in response to stimuli.

The micelle referred to here includes a micelle which an amphipathic substance forms in an aqueous solvent, and a so-called reversed micelle which an amphipathic substance forms in an organic solvent. In the present invention, the use of water as a main solvent is preferred. These micelles are formed in a form containing the block polymer. Thus, the block polymer preferably has an amphipathic property. The present invention is characterized in that the composition changes from a certain micelle (the first micelle state) to a micelle different therefrom (the second micelle state) in response to stimuli. This change is, for example, such a change that the properties of the micelle, such as micelle radius, zeta potential, and molecular motility, change, thereby causing the micelle to change into a different micelle state. These changes in the properties can be easily detected by means such as laser diffraction or light scattering, electrophoresis, and nuclear magnetic resonance spectrum, respectively.

In the present invention, the facts that such a change in the micelle state occurs in response to stimuli, and is accompanied, for example, by a critical change in the viscosity are preferred, because these facts enable the composition of the present invention to be used as an ink material with excellent fixing properties. For similar reasons, the above change being accompanied by a change in the composition from sol to gel is further preferred.

The expression "critical change" as used herein refers to the fact that the composition of the present invention changes in the state of the micelle, formed by the polymer contained in the composition, from a certain state to a different micelle state in response to stimuli, thereby causing a marked change in the state of the composition as compared with the state existent before application of the stimulating conditions; or that the properties of the composition are, in dependence on stimuli conditions, changed to a different state in tendency at the borderline between before and after giving certain stimuli conditions. For example, what is designated as "the critical change of viscosity" means that the state of the micelle formed by the polymer in the composition of the present invention changes from a certain state to a different micelle state in response to predetermined stimuli, thereby causing a great change in the viscosity of the composition as compared with the state existent before application of the stimuli, for example, the change of the composition from a liquid state to a semisolid state. The aforementioned sol-to-gel change, for example, can be included in such a critical change in the viscosity. The critical change may be a sudden change or a gradual slow change.

The cause of the above change in the micelle state is preferably a change in the properties of at least one of the blocks of the block polymer by stimuli. Concretely, the change of the properties of the relevant block includes, for example, the change of the block from hydrophobic property to hydrophilic property, the change of the block from hydrophilic property to hydrophobic property, or the change of the degree of hydrophilicity.

The block polymer essentially used in the composition of the present invention is preferably amphipathic. This block polymer plays a central role in micelle formation, and can take at least two different micelle states. This is a major characteristic of the present invention. The preferred block polymer is one having a solvophilic or hydrophilic block and a solvophobic or hydrophobic block, either block having changeable properties. An example of such a block polymer includes an AB type block polymer in which one of A and B is a hydrophilic block, while the other is a hydrophobic block, the hydrophilic block having changeable properties.

An ABC type block polymer is also preferred. Specific examples include (1) an ABC type triblock polymer compound comprising a solvophobic A block, a B block changing in property from solvophilic to solvophobic or from solvophobic to solvophilic in response to stimuli, and a solvophilic C block, (2) an ABC type triblock polymer compound comprising a hydrophobic A block, a B block changing in property from hydrophilic to hydrophobic or from hydrophobic to hydrophilic in response to stimuli, and a hydrophilic C block, (3) an ABC type triblock polymer compound characterized in that the change from solvophobic property to solvophilic property or from solvophilic property to solvophobic property in response to stimuli occurs sequentially, first in the A block, and then in the B block, and (4) an ABC type triblock polymer compound characterized in that the change from solvophobic property to solvophilic property or from solvophilic property to solvophobic property in response to stimuli occurs sequentially, first in the A block, then in the B block, and finally in the C block.

In the present invention, a polymer containing a polyvinyl ether structure can be preferably used as the structure of the block polymer. Such a polymer can be synthesized as a block polymer by the cation living polymerization method. The concrete repeating unit structure of the polymer is preferably the structure shown by the following general formula (1):

General Formula (1)

$$-(CH_2-CH(OR^1))- \quad (1)$$

where $R^1$ is selected from linear, branched or cyclic alkyl groups having 1 to 18 carbon atoms, phenyl (Ph), pyridyl (Pyr), Ph-Ph, Ph-Pyr, or $-(CH(R^2)-CH(R^3)-O)_l-R^4$ or $-(CH_2)_m-(O)_n-R^4$; the hydrogen on the aromatic ring can be substituted by a linear or branched alkyl group having 1 to 4 carbon atoms, and the carbon in the aromatic ring can be substituted by nitrogen; l is selected from integers of 1 to 18, m is selected from integers of 1 to 36, n is 0 or 1; $R^2$ and $R^3$ are each independently H or $CH_3$; $R^4$ comprises H, a linear, branched or cyclic alkyl group having 1 to 18 carbon atoms, Ph, Pyr, Ph-Ph, Ph-Pyr, $-CHO$, $-CH_2CHO$, $-CO-CH=CH_2$, $-CO-C(CH_3)=CH_2$, or $CH_2COOR^5$, provided that when $R^4$ is other than hydrogen, the hydrogen on the carbon atom can be substituted by a linear or branched alkyl group having 1 to 4 carbon atoms, F, Cl or Br, and the carbon in the aromatic ring can be substituted by nitrogen; and $R^5$ is H or an alkyl group having 1 to 5 carbon atoms. This polymer will be described in detail later on.

The composition of the present invention, as stated earlier, is characterized by changing from a state in which it takes a certain micelle form to a state in which it takes a different micelle form, in response to stimuli. This responsiveness may be to a temperature change, may be to exposure to electromagnetic waves, may be to a pH change, or may be to a change in the concentration of the composition, and at least two of these stimuli may be combined.

The composition of the present invention, as discussed already, is effectively used as an image-forming material, and effectively used as an ink composition, in particular. The composition can also be used preferably as ink-jet ink for an ink-jet process.

The composition of the present invention is a functional material, and contains a block polymer, a solvent, and a coloring material. Thus, in addition to the above-described use for the ink composition, the composition of the invention can be used, typically, as a composition usable for cosmetics, such as lipsticks, foundations, rouge, and moisturizing creams, or as a coloring material such as a toner containing a colorant.

Since the composition of the present invention is preferably used as an image-forming material, as will be described later on, the coloring material contained in the composition is preferably a pigment or a dye.

The composition of the present invention also contains a solvent. The solvent contained in this composition refers to, but is not limited to, a medium capable of dissolving, suspending or dispersing the components contained in the composition. In the present invention, organic solvents such as various aliphatic hydrocarbons with a linear, branched or cyclic structure, aromatic hydrocarbons and heteroaromatic hydrocarbons; aqueous solvents; and water are contained as solvents. Water and an aqueous solvent, in particular, can be used preferably in the composition of the present invention. Examples of the aqueous solvent are polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethyl ether, ethylene glycol monobutyl ether, diethylene glycol monoethyl ether, and diethylene glycol monobutyl ether; and nitrogen-containing solvents such as N-methyl-2-pyrrolidone, substituted pyrrolidone, and triethanolamine. For uses as ink, monohydric alcohols, such as methanol, ethanol and isopropyl alcohol, can be used to quicken drying on paper.

The composition of the present invention is characterized by responding to various stimuli and changing in properties. When used in cosmetics, the composition can impart, for example, the function of increasing retention on the skin, or the function of making color fadeout difficult, because of its properties changing from the point of makeup onward.

Particularly preferred in the present invention is the utilization of the composition as a coloring material whose properties change responsive to stimuli. When the composition of the present invention is used as a pigment dispersion ink material, this composition gives high dispersion stability to the pigment, is improved in bleeding or feathering when adhered to a recording medium, and is highly fixable. Thus, the composition of the present invention as the pigment dispersion ink material can be utilized as a high image quality, low energy consumption, high speed image-forming material.

The block polymer characteristically used in the present invention plays a central role in satisfactorily dispersing a substance, which has a predetermined function, in a solvent, and changing in the micelle state in response to stimuli. The block polymer can substantially retain the properties of repeating unit structures of the respective blocks or units, and show these properties in a coexistent form. The block polymer used in the composition of the present invention has the amphipathic units, and forms a micelle and disperses in water highly. The block or unit portions having responsiveness to stimuli function effectively, and their functionality can appear efficiently compared with a random polymer. The block polymer used in the present invention may be a conventionally known block polymer, such as an acrylic or methacrylic block polymer, a block polymer of polystyrene with other addition polymerization system or condensation polymerization system, or a block polymer having a block of polyoxyethylene or polyoxyalkylene. In a preferred embodiment of the present invention, a block polymer containing the polyvinyl ether structure to be described below is preferably used. In the present invention, moreover, it is also possible to use a graft polymer or a graduation polymer in which the polymer contains a polyvinyl ether structure.

An example of the block polymer used in the present invention is an ABC type triblock polymer in which two of the respective blocks have two or more different kinds of hydrophilic blocks, and the remaining one block is hydrophobic. When such an amphipathic triblock polymer is dispersed in water, a micelle is formed. The term "different" herein refers to a different chemical structure. That is, it means that the monomer structure of the each block is different, or that copolymerization ratio of the branched structure in the polymer chain is different, and it does not mean that only the molecular chain length of the single repeating unit in the polymer chain is different. Thus, each block may comprise a single repeating unit structure, or may comprise a plurality of randomly repeating unit structures, or may take a form in which the proportions of plural repeating unit structures gradually change. Of the two kinds of hydrophilic blocks of the triblock polymer, one of the blocks is a block which changes in nature from hydrophilic to hydrophobic in response to stimuli. This block can inversely change from hydrophobic to hydrophilic depending on conditions after becoming hydrophobic. The block polymer having such a block is such that at least one of the hydrophilic blocks among the two or more different kinds of hydrophilic blocks responds to stimuli and changes from hydrophilic to hydrophobic. Owing to this phenomenon, the block polymer changes into the state of a micelle different from the micelle present before response to the stimuli, thereby changing the properties of the composition, for instance, viscosity. Conversely, the block, which showed a hydrophobic property under certain conditions, can change into a hydrophilic block in response to stimuli, thereby changing the properties of the composition, for instance, viscosity. When the state of the micelle changes in this manner, the measurement of the micelle radius by laser diffraction or light scattering shows that this radius after response to stimuli has changed greatly compared with that before response to stimuli.

As noted above, the change in the micelle state affects, directly or indirectly, the various properties of the composition, including viscosity. For example, if the response to stimuli is that to a temperature change, the micelle radius changes critically in response to the temperature change (that is, the radius changes rapidly or gradually, with the temperature conditions or temperature change serving as the borderline conditions). Responsive to this change in the micelle radius, viscosity, for example, critically changes according to the temperature change. Depending on the structure of the block polymer or the type of stimuli given, an even greater viscosity change occurs, and can result in the transition of the composition in the sol state into gel.

Based on this concept, not only the ABC type, but also an AB type, an ABA type, an ABCD type or an ABCA type (here, D is a block with a structure different from that of A, B or C, and may be hydrophilic or hydrophobic) can be used as the type of the blocks of the block polymer. The above-described form of the block polymer is a basic skeleton of the polymer structure, and the block polymer of the present invention can include variously modified structures, for example, those having a straight chain terminal or a branch terminal modified with a functional group, those having a straight chain terminal portion or a branch terminal portion chemically or physically adsorbed to a functional substance, or those grafted to other polymer.

The polyvinyl ethers will be described below, which are preferably used as the block polymer of the present invention. The polymer having polyvinyl ether structure has more preferable dispersibility, since the polyvinyl ether structure generally has a low glass transition point and has flexible property, thereby having compatible points where the hydrophobic segments are physically entangled with pigments and are easy to be compatible with them. Many reports have been made, regarding synthesis of block polymer having polyvinyl ether structures (for example, JP-A 080221/1999). Among them, the typical method is cation living polymerization described by Aoshima et al. (JP-A 322942/1999, JP-A 322866/1999). The synthetic method of the polymer using cation living polymerization gives various polymers such as block polymers, graft polymers and graduation polymers, with a uniform length (molecular weight) accurately. Polyvinyl ethers may have various functional groups introduced into the side chains thereof. Cation polymerization method may also be effected in HI/I$_2$ or HCl/SnCl$_4$ system or the like.

Though not specifically being limited, the molecular structure of the repeating units of the polymer having polyvinyl ether structure is preferably represented by the following general formula (1):

—(CH$_2$—CH(OR$^1$))-                (1)

wherein R$^1$ is selected from a linear, branched or cyclic alkyl group having from 1 to 18 carbon atoms, a phenyl (Ph) group, a pyridyl (Pyr) group, or a group of Ph-Ph, Ph-Pyr, —(CH(R$^2$)—CH(R$^3$)—O)$_l$—R$^4$ and —(CH$_2$)$_m$—(O)$_n$—R$^4$; the hydrogen atom on the aromatic ring may be substituted with a linear or branched alkyl group having from 1 to 4 carbon atoms; and the carbon in the aromatic ring may be substituted with a nitrogen atom; l is an integer 1 to 18; m is an integer 1 to 36; and n is 0 or 1; R$^2$ and R$^3$ each independently represent H or CH$_3$, preferably both R$^2$ and R$^3$ are H (that is, —(CH$_2$—CH$_2$—O)$_l$—R$^4$); R$^4$ comprises H, a linear, branched or cyclic alkyl group having 1 to 18 carbon atoms, Ph, Pyr, Ph-Ph, Ph-Pyr, —CHO, —CH$_2$CHO, —CO—CH=CH$_2$, —CO—C(CH$_3$)=CH$_2$, or CH$_2$COOR$^5$, provided that when R$^4$ is other than hydrogen, the hydrogen on the carbon atom can be substituted by a linear or branched alkyl group having 1 to 4 carbon atoms, F, Cl or Br, and the carbon in the aromatic ring can be substituted by nitrogen; and R$^5$ is H or an alkyl group having 1 to 5 carbon atoms.

In the present invention, the linear or branched alkyl group includes, for example, methyl, ethyl, n-propyl, i-propyl, n-butyl, sec-butyl, tert-butyl, pentyl, n-hexyl, heptyl, octyl, nonyl, decyl, undecyl, dodecyl and octadecyl groups. The cyclic alkyl group includes, for example, cyclopropyl, cyclobutyl, cyclopentyl, cyclohexyl and cyclooctyl groups. When hydrogen atom on the carbon atom is substituted, substitution may occur at one or more positions.

The examples of vinyl ether monomer structures are mentioned below. However, The structures of present invention are not limited thereto.

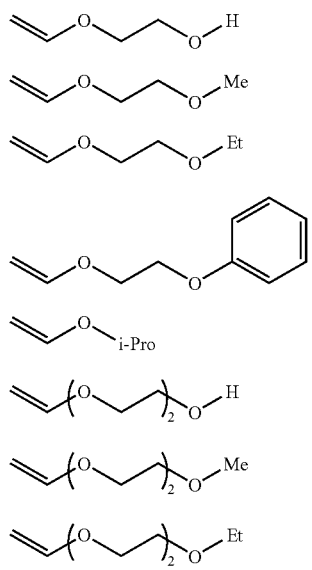

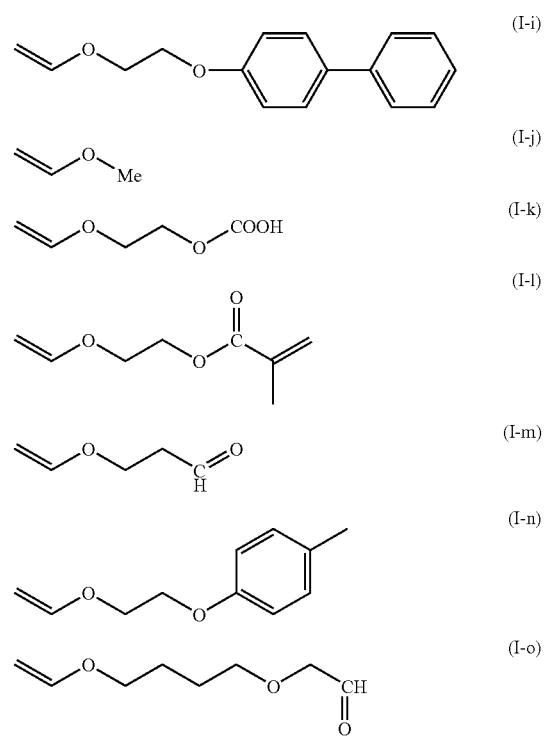

The structures of the vinyl ether polymers formed from these vinyl ether monomers will be cited below, but the polymers for use in the present invention are not limited thereto. If the polyvinyl ether structure is formed from two or more vinyl ether monomer components, namely, if the vinyl ether polymer is a copolymer, the vinyl ether polymer may be a random polymer, a block polymer, a graduation polymer, or a graft polymer. Examples of the copolymer used in the present invention are listed below, but the copolymers of the present invention are not limited thereto.

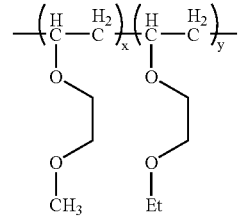

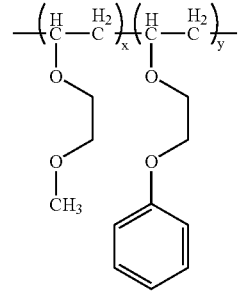

-continued

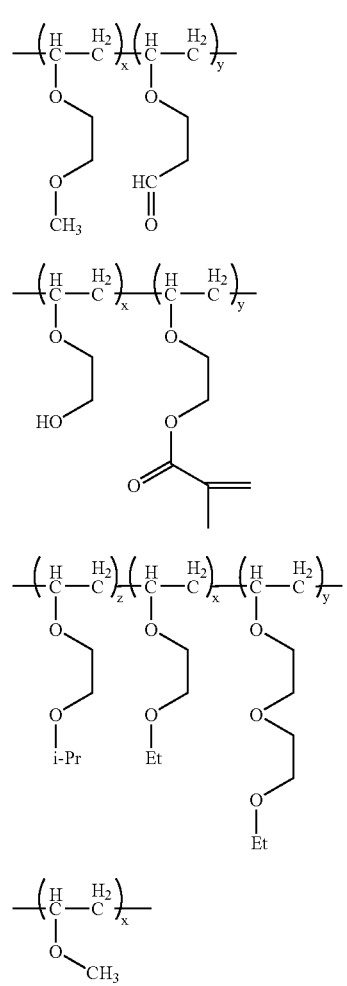

(II-c)

(II-d)

(II-e)

(II-f)

(II-g)
—[CH$_2$—CH(OCH$_2$CH$_2$—OCH$_3$)]$_x$-b-{[CH$_2$—CH(OCH$_2$CH$_2$—OC$_2$H$_5$)]$_p$-r-[CH$_2$—CH(OCH$_2$CH$_2$—OCH$_3$)]$_q$}$_y$-b-[CH$_2$—CH(OCH$_2$CH$_2$—OC$_2$H$_5$)]$_z$—

(II-h)
—[CH$_2$—CH(OCH$_2$CH$_2$—CH(CH$_3$)$_2$)]$_x$-b-[CH$_2$—CH(OCH$_2$CH$_2$—OC$_2$H$_5$)]$_y$—

(II-i)
—[CH$_2$—CH(OCH$_2$CH$_2$—OCH$_3$ )]$_x$-b-[CH$_2$—CH(OCH$_2$CH$_2$—OCH$_2$CH$_2$—OC$_2$H$_5$)]yb-[CH$_2$—CH(OCH$_2$CH$_2$—OC$_2$H$_5$)]$_z$—

(II-j)
—[CH$_2$—CH(OCH$_2$CH$_2$—OH)]$_x$-b-[CH$_2$—CH(OCH$_2$CH$_2$—OC$_2$H$_5$)]$_y$—

(II-k)
—[CH$_2$—CH(OCH$_2$CH$_2$CH$_2$CH$_2$ —OH)]$_x$-b-[CH$_2$ —CH(OCH$_2$CH$_2$—OC$_2$H$_5$ )]$_y$—

(II-l)
—[CH$_2$ —CH(OCH$_2$CH$_2$ —OC$_2$H$_5$ )]$_x$-b-[CH$_2$ —CH(OCH$_2$CH$_2$ —OCOC(CH$_3$)=CH$_2$)]$_y$—

Further preferably, the numbers (x, y, z) of the repeating units of the polyvinyl ether are each independently 1 or more, but 10,000 or less; p and q are each 0 or more, but 1 or less, and the sum of P and q is 1. More preferably, the total number (x+y+z) of the repeating units is 10 or more, but 40,000 or less.

Further concrete examples of the polyvinyl ether polymers shown above will be described. In an aqueous solvent, the properties of the block from the monomer component I-b are such that when heated, the block changes from hydrophilic property to hydrophobic property at about 70° C., as disclosed in Polymer Preprints, Japan Vol. 49, No. 12, 3653 (2000). The properties of the block from the monomer component I-c are similarly such that when heated, the block changes from hydrophilic property to hydrophobic property at about 20° C., as disclosed in Polymer Preprints, Japan Vol. 49, No. 12, 3653(2000). In connection with the block of a random polymer from I-b and I-c, a change of property occurs at a temperature between the transition temperatures of the respective monomer components according to their proportions, as shown in Polymer Preprints, Japan Vol. 49, No. 12, 1226(2000). Utilizing these phenomena, if an ABC block polymer composed of a block A comprising the monomer component I-b, a block B comprising a random copolymer of I-b and I-c (ratio in copolymer: 1:1), and a block C comprising the monomer component I-c is used, in the range from about 20° C. until about 40° C. that the modification temperature of the random copolymer B, a micelle state in which the C block is the hydrophobic center can be developed, and in the range from about 40° C. that the property-changing temperature of the random copolymer, until about 70° C. that the property-changing temperature of the block A comprising the monomer component I-b, a micelle state in which the B block and the C block having a hydrophobic property can be developed. The former micelle and the latter micelle are clearly different, and can be easily detected by dynamic light scattering, laser diffraction, or nuclear magnetic resonance spectrum. In the present invention, the pigment is preferably coexistent in a form having an affinity for the hydrophobic block.

In the foregoing descriptions, the hydrophobic or hydrophilic block, in particular, has been taken as an example, but the present invention is not limited thereto, and the solvophobic or solvophilic block may be used. That is, the above-mentioned change from hydrophobic property to hydrophilic property, or the change from hydrophilic property to hydrophobic property may be the change from solvophobic property to solvophilic property, or the change from solvophilic property to solvophobic property.

In the composition of the present invention, the particle size, average particle size (radius), of the micelle is preferably 5 nm or more, but 100 nm or less. If the average particle size (radius) of the micelle is 5 nm or more, but 100 nm or less, dispersion of the pigment takes place satisfactorily.

The composition of the present invention changes in its micelle state in response to various stimuli. Examples of the stimuli in the present invention are a temperature change, application of an electric field, exposure to light (electromagnetic waves) such as ultraviolet rays, visible rays or infrared rays, a change in the pH of the composition, addition of a chemical substance, and a change in the concentration of the composition. Herein, "stimuli-responsive (or stimuli-responsiveness)" means that the composition of the present invention changes in properties in response to the stimuli as described above. That is, "stimuli-responsive (or stimuli-responsiveness)" refers to the fact that when stimuli, such as exposure to electromagnetic waves, application of an electric field, temperature change, pH change, addition of a chemical substance, or a change in the concentration of the composition, are applied to the composition, the properties of the composition change in accordance with the stimuli (environmental change). The change in the properties can be selected variously according to the purpose of use of the composition of the present invention. For utilization as an image-forming material, for example, the composition undergoes a sudden increase in viscosity or a sudden phase change (e.g., change from sol to gel) in response to stimuli, resulting in an increase in fixing onto a recording medium. In the present invention, preferred examples of stimuli-responsiveness are as follows: a first one is that to a temperature change, the range of the temperature change being the range across the phase transition temperature of the composition. In the composition of the present invention, moreover, stimuli-responsiveness is that to exposure to electromagnetic waves, whose wavelengths preferably range from 100 to 800 nm. In the composition of the present invention, moreover, stimuli-responsiveness is that to the pH change of the composition, the range of the pH change being preferably from pH 3 to pH 12. The stimuli-responsiveness in the present invention further includes that to a change in the concentration of the composition. Examples of the stimuli in this case include a concentration change due to evaporation or absorption of the solvent of the composition, and a change in the concentration of the composition as a result of a change in the concentration of the dissolved polymer in the composition. With such stimuli, the change in the concentration is preferably in the range covering concentrations across the concentration at which the composition undergoes phase transition. In the present invention, at least two of these stimuli may be combined.

The composition of the present invention has various applications, such as agricultural chemicals, medicines, cosmetics, and coloring materials. Particularly preferred use is in an ink material containing a pigment or a dye, and using water or other solvent. The use of the composition of the present invention makes it possible to improve various properties of the ink material, including fixing properties. The composition is also used preferably as ink for an ink-jet printer.

Next, the components of the composition of the present invention, other than the block polymer, will be described in detail.

[Water]

Water in the aqueous dispersion of the present invention is preferably ion-exchange water not containing metal ions, pure water, or ultra-pure water.

[Aqueous Solvent]

For the aqueous solvent, for example, usable are polyalcohols such as ethylene glycol, diethylene glycol, triethylene glycol, polyethylene glycol, propylene glycol, polypropylene glycol, glycerin; polyalcohol ethers such as ethylene glycol monomethyl ether, ethylene glycol monoethyl ether, ethylene glycol monobutyl ether, diethylene glycol monoethyl ether, diethylene glycol monobutyl ether; and nitrogen-containing solvents such as N-methyl-2-pyrrolidone, substituted pyrrolidones, triethanolamine. For accelerating the drying speed of the aqueous dispersion on recording media, usable are monohydric alcohols such as methanol, ethanol, isopropyl alcohol.

In case where the composition of the present invention is ink, the content of the water or aqueous solvent is preferably a range of 20 to 95% by weight, more preferably 30 to 90% by weight based on the total weight of the aqueous dispersion.

[Coloring Material]

The useful coloring material in the present invention can use a pigment, a dye, etc. according to the uses of the composition of the present invention. The amount of the coloring material used in the present invention is preferably 0.1 to 50% by weight based on the weight of the composition of the present invention.

In the case of ink, a preferred embodiment of the present invention, a dye or a pigment is usually used. Concrete examples of the pigment and the dye for the application of the aqueous dispersion of the present invention as ink will be described below. The pigment may be an organic pigment or an inorganic pigment, and the pigment used in ink includes, preferably, a black pigment and pigments of the three primary colors, cyan, magenta and yellow. Furthermore, color pigments other than those stated above, colorless or light-color pigments, and pigments with a metallic luster may be used. Besides, newly synthesized pigments may be used for the present invention.

Examples of commercially-available black, cyan, magenta and yellow pigments are mentioned below.

Black pigments are, not limited to, Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRAII, Raven 1190 ULTRAII (all by Columbia Carbon); Black Pearls L, MOGUL-L, Regal 400R, Regal 660R, Regal 330R, Monarch 800, Monarch 880, Monarch 900, Monarch 1000, Monarch 1300, Monarch 1400 (all by Cabot); Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, Printex 140V (all by Dexxa); No. 25, No. 33, No. 40, No. 47, No. 52, No. 900, No. 2300, MCF-88, MA600, MA7, MA8, MA100 (all by Mitsubishi Chemical) and the like.

Cyan pigments are, not limited to, C.I. Pigment Blue-1, C.I. Pigment Blue-2, C.I. Pigment Blue-3, C.I. Pigment Blue-15, C.I. Pigment Blue-15:2, C.I. Pigment Blue-15:3, C.I. Pigment Blue-15:4, C.I. Pigment Blue-16, C.I. Pigment Blue-22, C.I. Pigment Blue-60 and the like.

Magenta pigments are, not limited to, C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202, C.I. Pigment Red-207 and the like.

Yellow pigments are, not limited to, C.I. Pigment Yellow-12, C.I. Pigment Yellow-13, C.I. Pigment Yellow-14, C.I. Pigment Yellow-16, C.I. Pigment Yellow-17, C.I. Pigment Yellow-74, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151, C.I. Pigment Yellow-154 and the like.

In the composition of the present invention, self-dispersible pigments in water are also usable. As the water-dispersible pigments, there are pigments that adsorb a polymer on their surface and thus use its steric hindrance, and that use electrostatic repulsion force. Commercial products of the pigments are CAB-0-JET200, CAB-0-JET300 (both by Cabot), and Microjet Black CW-1 (by Orient Chemical) and the like.

Preferably, An amount of the pigment used in the ink of the present invention is from 0.1 to 50% by weight based on the weight of the ink. If the pigment content is less than 0.1% by weight, sufficient image density could not be obtained, and if it is greater than 50% by weight, image fixation property may be increased. More preferable range of the pigment content is 0.5% by weight to 30% by weight.

A known dye may be used in the ink of the present invention, including, for example, water-soluble dyes such as direct dyes, acid dyes, basic dyes, reactive dyes, water-soluble dyes for a food color, and insoluble colorant of disperse dyes. These are mentioned below.

For example, water-soluble dyes are:

direct dyes such as C.I. Direct Black, -17, -19, -22, -32, -38, -51, -62, -71, -108, -146, -154;

C.I. Direct Yellow, -12, -24, -26, -44, -86, -87, -98, -100, -130, -142;

C.I. Direct Red, -1, -4, -13, -17, -23, -28, -31, -62, -79, -81, -83, -89, -227, -240, -242, -243;

C.I. Direct Blue, -6, -22, -25, -71, -78, -86, -90, -106, -199;

C.I. Direct Orange, -34, -39, -44, -46, -60;

C.I. Direct Violet, -47, -48;

C.I. Direct Brown, -109;

C.I. Direct Green, -59; and the like;

acid dyes such as C.I. Acid Black, -2, -7, -24, -26, -31, -52, -63, -112, -118, -168, -172, -208;

C.I. Acid Yellow, -11, -17, -23, -25, -29, -42, -49, -61, -71;

C.I. Acid Red, -1, -6, -8, -32, -37, -51, -52, -80, -85, -87, -92, -94, -115, -180, -254, -256, -289, -315, -317;

C.I. Acid blue, -9, -22, -40, -59, -93, -102, -104, -113, -117, -120, -167, -229, -234, -254;

C.I. Acid Orange, -7, -19;

C.I. Acid Violet, -49; and the like;

reactive dyes such as C.I. Reactive Black, -1, -5, -8, -13, -14, -23, -31, -34, -39;

C.I. Reactive Yellow, -2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, -163;

C.I. Reactive Red, -3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, -221;

C.I. Reactive Blue, -2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, -217;

C.I. Reactive Orange, -5, -7, -11, -12, -13, -15, -16, -35, -45, -56, -62, -70, -72, -74, -82, -84, -87, -91, -92, -93, -95, -97, -99;

C.I. Reactive Violet, -1, -4, -5, -6, -22, -24, -33, -36, -38;

C.I. Reactive Green, -5, -8, -12, -15, -19, -23;

C.I. Reactive Brown, -2, -7, -8, -9, -11, -16, -17, -18, -21, -24, -26, -31, -32, -33; and the like; as well as, C.I. Basic Black, -2;

C.I. Basic Red, -1, -2, -9, -12, -13, -14, -27;

C.I. Basic Blue, -1, -3, -5, -7, -9, -24, -25, -26, -28, -29;

C.I. Basic Violet, -7, -14, -27;

C.I. Food Black, -1, -2; and the like.

The coloring materials mentioned above are especially favorable for the ink of the present invention, but the coloring materials to be used in the ink of the present invention are not limited to those mentioned above. Preferably, an amount of the dye used in the ink of the present invention is from 0.1 to 50% by weight based on the weight of the ink.

[Additives]

The composition of the present invention may optionally contain various additives and auxiliaries.

One example of additives for the composition is a dispersion stabilizer that allows a pigment to be stably dispersed in solvent. The composition of the present invention has the function of dispersing a particulate solid such as pigment in terms of a polymer having polyvinyl ether structure, but if dispersion of the particulate solid is insufficient, other dispersion stabilizer may be added. As other dispersion stabilizer, a resin or a surfactant that has both hydrophilic segments and hydrophobic segments may be used. The resin having both hydrophilic segments and hydrophobic segments includes, for example, a copolymer of a hydrophilic monomer and a hydrophobic monomer. The hydrophilic monomer includes, for example, acrylic acid, methacrylic acid, maleic acid, fumaric acid, and monoesters of such carboxylic acids, vinylsulfonic acid, styrenesulfonic acid, vinyl alcohol, acrylamide, methacryloxyethyl phosphate or the like; and the hydrophobic monomer includes, for example, styrene, styrene derivatives such as α-methylstyrene, vinylcyclohexane, vinylnaphthalene derivatives, acrylates, and methacrylates or the like. A various type of copolymer may be used such as random, block or graft copolymers. Of cause, both the hydrophilic monomers and the hydrophobic monomers are not limited to those mentioned above. The surfactant may be used such as anionic, nonionic, cationic or ampholytic surfactants. The anionic surfactant includes, for example, salts of fatty acids, salts of alkylsulfates, alkylarylsulfonates, alkyl-diarylether disulfonates, dialkylsulfosuccinates, alkylphosphates, naphthalenesulfonic acid-formalin condensates, salts of polyoxyethylene-alkylphosphates, and glycerol borate fatty acid esters. The nonionic surfactant includes, for example, polyoxyethylene alkyl ethers, polyoxyethylene-oxypropylene block copolymers, sorbitan fatty acid esters, glycerin fatty acid esters, polyoxyethylene fatty acid esters, polyoxyethylene alkylamines, fluorine-containing surfactants, and silicon-containing surfactants. The cationic surfactant includes, for example, alkylamine salts, quaternary ammonium salts, alkylpyridinium salts, and alkylimidazolium salts. The ampholytic surfactant includes, for example, alkylbetaines, alkylamine oxides, and phosphatidyl choline. The surfactant is not also limited to those mentioned above.

Further, an aqueous solvent may optionally added to the composition of the present invention. Especially for ink-jet ink, the aqueous solvent is effective for preventing the ink from drying and solidifying around nozzles. One or more different types of aqueous solvents may be used alone or as mixture. The aqueous solvent may be the same as those described above. For ink, a content of the aqueous solvent ranges preferably 0.1 to 60% by weight, more preferably 1 to 25% by weight based on the total amount of ink.

For example, in case of using as ink, the other additives include a pH controlling agent that ensures the stabilization of ink and the stability of ink with the ink pipes in recording apparatus; a penetrant having the ability to enhance ink penetration into recording media and to accelerate the apparent ink drying on them; an antifungal agent to prevent the development of fungi in ink; a chelating agent that sequesters metal ions in ink to thereby prevent deposition of metal around nozzles and prevent deposition of insoluble solids in ink; a defoaming agent that prevents ink from foaming of a recording liquid during circulation, moving or at the time of production of the recording liquid; and also antioxidant, antifungal agent, viscosity controlling agent, electrical conductive agent, UV absorbent, water-soluble dye, disperse dye, oil-soluble dye, or the like.

The content (%) of the block polymer used in the present invention is preferably in the range of 0.1 wt. % to 30 wt. %, more preferably in the range of 0.5 wt. % to 15 wt. %, in the composition. At a concentration in excess of 30 wt. %, viscosity may be too high particularly for use in ink. At a concentration less than 0.1 wt. %, dispersion performance or stimuli-responsive performance may be insufficient.

Ink-jet ink (aqueous dispersion ink) of a preferred embodiment of the ink of the present invention is described in detail below.

[Method for Producing Ink-Jet Ink]

The preparation method of the ink-jet ink of the present invention, for example, comprises adding pigment, block polymer and optionally dispersion stabilizer to water or water-soluble solvent, dispersing them by the use of a dispersing machine, removing coarse particles by centrifugation etc., then adding water or solvent and additives thereto, stirring and mixing them, and filtering the resulting mixture.

The dispersing machine includes, for example, ultrasonic homogenizers, laboratory homogenizers, colloid mills, jet mills and ball mills, and one or more of these may be used alone or combination thereof.

In case where a self-dispersible pigment is used, ink compositions of the present invention may also be prepared in the same manner as mentioned above.

Next, the second to sixth aspects of the present invention will be described.

The second aspect of the present invention is an image-forming method using the composition of the present invention. The third aspect of the present invention is an image-forming apparatus relying on the image-forming method. The fourth aspect of the present invention is a recording medium for use in the image-forming method of the present invention, especially, a recording medium bearing, beforehand, stimulus characteristics to which the composition of the present invention responds. The fifth aspect of the present invention is a composition making a reversible change in response to stimuli among the compositions of the present invention, and a device using the composition. The sixth aspect of the present invention is a novel ABC type triblock polymer compound.

These aspects of the present invention will be described below.

[Image-Forming Method and Image-Forming Apparatus]

The ink composition of the present invention can be used for various image-forming apparatuses employing various methods, such as printing methods, ink-jet process, and electrophotography, and can be drawn as an image by an image-forming method using any of the apparatuses.

The image-forming method of the present invention is a method for performing excellent image formation with the use of the stimuli-responsive composition of the present invention. According to this method, recording is made by giving stimuli to the composition of the present invention at any point in time during the image-forming process and causing a change of the micelle state by the given stimuli. In the present invention, no restrictions are imposed on the type and number of changes of the state, and on the type and number of the stimuli given. For example, the image formation of the present invention may be completed when one of the blocks of the block polymer has changed from hydrophobic to hydrophilic in response to stimuli causing a change in temperature. Alternatively, the image formation may be completed such that one of the blocks of the block polymer changes from hydrophobic to hydrophilic in response to stimuli causing a change in temperature, and then the pH is changed, whereby the micelle radius is greatly increased, with the hydrophilic property of the block being maintained, and the viscosity is increased accordingly.

The image-forming method of the present invention is preferably an image-forming method which comprises ejecting the ink composition of the present invention from an ink ejection portion to impart the ink composition onto a recording medium, thereby making a recording. In the present invention, a substance or composition giving the stimuli may be provided beforehand on a recording medium. Preferably used for image formation is a method according to the ink-jet process, by which thermal energy is applied to ink to eject the ink.

For use as ink for ink-jet recording, the composition of the present invention can be used, for example, in the following modes:

(a) For Use as Ink Responsive to Temperature Stimuli:

Because of temperature stimuli ascribed to the difference between the temperature of ink within the ink tank and the temperature of ink on the recording medium having the ink adhered thereto by ejection, the ink for ink-jet recording of the present invention undergoes a change, suddenly increasing in viscosity.

(b) For Use as Ink Responsive to Stimuli Due to pH Change:

The pH of the ink within the ink tank changes under the influence of a recording medium after the ink adheres to the recording medium. Because of this pH change, the ink for ink-jet recording of the present invention undergoes a change, increasing in viscosity.

(c) For Use as Ink Responsive to Stimuli due to Concentration Change:

Because of a change in the concentration of ink ascribed to the difference between the concentration of ink within the ink tank and the concentration of the ink after evaporation of water and an aqueous solvent contained in the ejected ink, or after absorption of water and an aqueous solvent contained in the ejected ink by a recording medium, the ink for ink-jet recording of the present invention undergoes a phase change, increasing in viscosity.

The change of the ink properties can improve color blurring and feathering and provide excellent ink fixation. The changes of ink properties are not limited to the examples as mentioned above.

Various methods can be employed for applying stimuli to the ink. One preferred method comprises mixing a stimuli-giving composition with the stimuli-responsive ink or contacting it with the ink. For the pH-responsive ink of above (b) for example, an ink-jet process may be applied as a method for mixing the ink with a composition having a desired pH. As disclosed in JP-A 63185/1989, a stimuli-giving composition may be ejected through an ink-jet head onto the entire area of forming an image; or as disclosed in JP-A 216392/1996, the amount of the stimuli-giving composition may be controlled to ensure better image formation. The stimuli-giving composition may be used as an ink composition containing dye or pigment. For example, any ink of cyan-magenta-yellow-black (CMYK) inks used in a color ink-jet process may be a stimuli-giving ink, and any other ink of CMYK inks may be a stimuli-responsive ink to improve the color blurring. Regarding the matter as to which of CMYK is a stimuli-responsive ink and which of other CMYK is a stimuli-giving ink, there are various combinations of inks. In the present invention, any combination of inks is employable with no limitation on the selection. A stimuli-giving composition and a stimuli-responsive ink are not limited to those described above.

It is also preferred to apply, beforehand, a contrivance for giving stimuli to the recording medium. For example, a method can be named in which acid paper is recorded with the use of an acid-responsive ink among pH-responsive inks. In this case, the recording medium has the function of giving stimuli to the stimuli-responsive ink of the present invention. Such a recording medium is included in the present invention. That is, the present invention relates to a recording medium having the function of giving such stimuli. In the present invention, the recording medium may be in any known form. For example, plain paper, thermal recording paper, or acid paper can be named.

As ink-jet printers using the ink for ink-jet recording of the present invention, various ink-jet recorders are available, such as a piezo ink-jet system using a piezoelectric element, and a thermal ink-jet system which applies thermal energy to cause bubbling, thereby making recording.

Next described is the outline of an ink-jet recording apparatus with reference to FIG. 1. FIG. 1 shows one example of the constitution of an ink-jet recording apparatus, and is not intended to restrict the scope of the present invention.

FIG. 1 is a block diagram showing an ink-jet recording apparatus.

FIG. 1 is to illustrate a case of recording an image on a recording medium by moving the head in the apparatus. In FIG. 1, an X-direction driving motor 56 and a Y-direction driving motor 58, by which the head 70 is driven in X-Y direction, are connected to CPU 50 which controls the entire movement of the apparatus, via an X-motor driving circuit 52 and a Y-motor driving circuit 54, respectively. According to the indication of CPU, the X-direction driving motor 56 and the Y-direction driving motor 58 are driven via the X-motor driving circuit 52 and the Y-motor driving circuit 54, respectively, and the position of the head 70 relative to a recording medium is thereby determined.

As shown in FIG. 1, a head driving circuit 60 is connected to the head 70, in addition to the X-direction driving motor 56 and the Y-direction driving motor 58, and CPU 50 controls the head driving circuit 60, by which the head 70 is driven, that is, the ejection of ink-jet ink and the like is done. In addition, an X-encoder 62 and a Y-encoder 64 that detect the head position are connected to CPU 50, and the position information of the head 70 is inputted into CPU 50. A control program is also inputted into the program memory 66. Based on the position information from the control program, the X-encoder 62 and the Y-encoder 64, the head 70 is moved to be located in a desired position on a recording medium, and ejects ink-jet ink. In that manner, a desired image is recorded on the recording medium. In case where plural ink-jet inks are loaded in the image-recording apparatus, the above-mentioned operation is repeated for every ink-jet ink for a total of predetermined times to thereby record a desired image on a recording medium.

After the ink-jet ink has been ejected, if desired, the head 70 may be moved to a position of a cleaning means (not shown) which is to remove the excess ink from the head 70, whereby the head 70 can be cleaned by wiping it. For cleaning the head, any conventional method may be used.

After an image recording is completed, the recorded medium is transferred by a transfer mechanism (not shown), and a new recording medium is set in the apparatus.

Within the scope and the sprit of the present invention, the embodiment of the present invention illustrated hereinabove may be modified or changed. For example, although the above illustrated embodiment mentioned, in which the head 70 is moved in X-Y direction is described, the image recording is performed by moving the head in X-direction (or Y-direction) only and the recording medium in Y-direction (or X-direction) with linking them each other.

In the present invention, the head provide an superior result, which has a thermal energy-generating means (e.g., electro-thermal transducer, laser) for generating the thermal energy as the energy source for ejecting the ink-jet ink, and which eject the ink-jet ink by the thermal energy. Specifically, in the system, fine and precision images can be formed. Superior image recording is achieved by using of the ink-jet ink of the present invention.

Regarding the configuration and the principle of a typical apparatus equipped with the thermal energy-generating means, the basic principles disclosed, for example, in U.S. Pat. Nos. 4,723,129 and 4,740,796 are preferably used in carrying out the present invention. The system disclosed may apply to both on-demand type and continuous type, but especially it is effective to on-demand type. This is because in on-demand type, at least one driving signal, which gives rapid temperature increase that corresponds to eject information and exceeds nucleate boiling, is applied to an electro-thermal transducer that hold a liquid and is located in accordance with path, thereby to allow thermal energy to be generated and to cause film boiling on a heated surface of the head, and, as a result, foams corresponding to the driving signal in one-to-one are formed in liquid. With the growth and the contraction of the foam, the liquid is ejected from openings for ejecting, and at least one droplet is formed. If the driving signal is pulse-shape, it is more preferable since the foam growth and contraction may be attained suitably and immediately, the ejection of the liquid having superior responsiveness is achieved. For the pulse-shaped driving signal, preferred are those described in U.S. Pat. Nos. 4,463,359 and 4,345,262. When the condition described in U.S. Pat. No. 4,313,124, which is an invention relating to the rate of increase of the temperature of the heated surface, is adopted, more effective ejection is achieved.

Regarding the head configuration, a configuration described in U.S. Pat. Nos. 4,558,333 and 4,459,600 that disclose a configuration in which the heated surface is located at a bending portion, may be used in addition to a configuration of a combination the ejecting opening, the flow path of liquid and electro-thermal transducer as in the above-mentioned patent specifications, and is also within the scope of the present invention. In addition, the present invention has also effective results, when the invention is adopted other constitution that are based on JP-A 123670/1984 that discloses the configuration in which, for plural electro-thermal transducers, a common slit is used as an ejecting portion of the electro-thermal transducer, or on JP-A 138461/1984 that discloses the configuration in which an opening able to absorbed the pressure waves of thermal energy corresponds to an ejecting portion. In other words, even if any type of the head is used, according to the present invention an ink-jet ink is ejected reliably and efficiently.

Further, the present invention is also conveniently applied to the head of a full-line type having the length corresponding to the maximum width of recording media in the image-forming apparatus of the present invention. The head of this type may have a configuration in which plural head units are combined to satisfy the intended length of the head, or the head may be integrated as one head.

Still further, the present invention is also effective in serial-type apparatus where the head is fixed to the body of the image-forming apparatus, or where the head is an exchangeable chip-type one which may be, when mounted on the body of the image-forming apparatus, electrically connected to the body and supplied ink from the body.

The apparatus of the present invention may be provided with a means for removing a liquid drop. Provided with it, much better ejecting effect is achieved.

Addition of any preliminarily auxiliary means into the apparatus of the present invention is preferable since they further stabilize the effect of the present invention. Specifically, the additional preliminary means includes a capping means for head; a pressure or suction means; an electrothermal transducer or other heating elements, or a means for pre-heating comprising a combination thereof; and a pre-ejecting means for ejection different from a means for ejecting ink.

The most effective apparatus for the present invention is one which is able to realize the above-mentioned film boiling manner.

In the apparatus of the present invention, the amount of ink ejected through ejection ports of an ejection head for ink-jet recording ink is preferably in the range of 0.1 picoliter to 100 picoliters.

Also, the aqueous dispersion ink of the present invention can be used in an indirect recorder using a recording system by which ink is printed on an intermediate transfer member, and then transferred onto a recording medium such as paper. The aqueous dispersion ink may be applied to an apparatus utilizing an intermediate transfer member according to a direct recording system.

The composition of the present invention can also be used as an element or device. The composition which makes a reversible change can be used as an element or device. For example, the use of a composition containing the aforementioned block polymer responsive to a temperature change makes it possible to prepare an optical device in which the state of light scattering changes according to a change in the size of a micelle. This optical device can be formed by encapsulating the composition of the present invention into a cell transparent to visible light.

Next, the sixth aspect of the present invention will be described.

The sixth aspect of the present invention relates to a novel ABC type block polymer. Particularly, the ABC type block polymer of the present invention is an ABC type triblock polymer compound comprising, as respective blocks, an A block which is solvophobic or hydrophobic, a B block which changes in nature from solvophilic or hydrophilic to solvophobic or hydrophobic, or from solvophobic or hydrophobic to solvophilic or hydrophilic in response to stimuli, and a C block which is solvophilic or hydrophilic. Also, the ABC type block polymer of the present invention is an ABC type triblock polymer compound in which the A block and the B block change in nature from solvophobic to solvophilic or from solvophilic to solvophobic in response to stimuli, and this change occurs sequentially, in the A block and then in the B block. Furthermore, the ABC type triblock polymer compound of the present invention is a compound in which the respective blocks of the ABC type block polymer change in nature from solvophobic to solvophilic or from solvophilic to solvophobic in response to stimuli, and this change occurs sequentially, first in the A block, then in the B block, and finally in the C block. In the present invention, it is particularly preferred that the solvophilic property and the solvophobic property are hydrophilic property and hydrophobic property.

The ABC type triblock polymer compound of the present invention is preferably an ABC type triblock polymer compound containing a polyvinyl ether structure. Concretely, it is an ABC type triblock polymer compound having a repeating unit of the polyvinyl ether structure of the following general formula (1) described in connection with the first aspect of the invention:

General Formula (1)

(1)

In the general formula (1), the preferred definitions for $R^1$ in the present invention are as follows:

(I) $R^1$ is selected from linear, branched or cyclic alkyl groups having 1 to 18 carbon atoms, phenyl (Ph), pyridyl (Pyr), Ph-Ph, Ph-Pyr, or $—(CH(R^2)—CH(R^3)—O)_l—R^4$ or $—(CH_2)_m—(O)_n—R^4$; the hydrogen on the aromatic ring can be substituted by a linear or branched alkyl group having 1 to 4 carbon atoms, and the carbon in the aromatic ring can be substituted by nitrogen; l is selected from integers of 1 to 18, m is selected from integers of 1 to 36, n is 0 or 1; $R^2$ and $R^3$ are each independently H or $CH_3$, and preferably, both $R^2$ and $R^3$ are H (that is, $—(CH_2—CH_2—O)_l—R^4$); $R^4$ comprises H, a linear, branched or cyclic alkyl group having 1 to 18 carbon atoms, Ph, Pyr, Ph-Ph, Ph-Pyr, $—CHO$, $—CH_2CHO$, $—CO—CH=CH_2$, $—CO—C(CH_3)=CH_2$, or $CH_2COOR^5$, provided that when $R^4$ is other than hydrogen, the hydrogen on the carbon atom can be substituted by a linear or branched alkyl group having 1 to 4 carbon atoms, F, Cl or Br, and the carbon in the aromatic ring can be substituted by nitrogen; and $R^5$ is H or an alkyl group having 1 to 5 carbon atoms.

(II) $R^1$ is selected from linear, branched or cyclic alkyl groups having 1 to 18 carbon atoms, or $—(CH(R^2)—CH(R^3)—O)_l—R^4$ or $—(CH_2)_m—(O)_n—R^4$; l and m are each independently selected from integers of 1 to 6; n is 0 or 1; $R^2$ and $R^3$ are each independently H or $CH_3$; $R^4$ comprises H, a linear, branched or cyclic alkyl group having 1 to 6 carbon atoms, Ph, Pyr, Ph-Ph, or $CH_2COOR^5$, provided that when $R^4$ is other than hydrogen, the hydrogen on the carbon atom can be substituted by a linear or branched alkyl group having 1 to 4 carbon atoms, F, Cl or Br, and the carbon in the aromatic ring can be substituted by nitrogen; and $R^5$ is H or an alkyl group having 1 to 5 carbon atoms.

(III) $R^1$ is selected from linear, branched or cyclic alkyl groups having 1 to 18 carbon atoms, or $—(CH^2—CH_2—O)_l—R^2$ or $—(CH_2)_m—(O)_n—R^2$; l and m are each independently selected from integers of 1 to 6; n is 0 or 1; $R^2$ comprises H, a linear, branched or cyclic alkyl group having 1 to 6 carbon atoms, Ph, Pyr, Ph-Ph, or $CH_2COOR^3$, provided that the carbon in the aromatic ring can be substituted by nitrogen; and $R^3$ is H or an alkyl group having 1 to 5 carbon atoms.

(IV) $R^1$ is selected from $—(CH_2—CH_2—O)_l—R^2$ or $—(CH_2)_m—(O)_n—R^2$; l and m are each independently selected from integers of 1 to 6; n is 0 or 1; and $R^2$ is H or a linear, branched or cyclic alkyl group having 1 to 6 carbon atoms.

(V) $R^1$ is selected from $—(CH_2—CH_2—O)_l—R^2$; l is selected from integers of 1 to 2; and $R^2$ is H or a linear, branched or cyclic alkyl group having 1 to 4 carbon atoms.

(VI) $R^1$ is selected from $—(CH_2—CH_2—O)_l—R^2$; l is selected from integers of 1 to 2; and $R^2$ is H, $CH_3$ or $C_2H_5$.

The ABC type triblock polymer of the present invention, whose polyvinyl ether structure has the repeating unit of the general formula (1), preferably has a total of 20 or more, but 40,000 or less, of the repeating units.

Particularly in the present invention, of the above-described ABC type block polymers of the present invention, a novel ABC type triblock polymer compound is preferred which is characterized in that the change from hydrophobic property to hydrophilic property or the change from hydrophilic property to hydrophobic property in the respective blocks, caused in response to stimuli, occurs sequentially, first in the A block, then in the B block, and finally in the C block.

Furthermore, the ABC type triblock polymer compound of the present invention is preferably a compound having the following general formula (2).

General Formula (2)

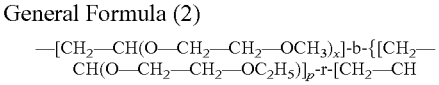

(O—CH$_2$—CH$_2$—OCH$_3$) ]$_q$}$_y$-b-[CH$_2$—CH
(O—CH$_2$—CH$_2$—OC$_2$H$_5$)]$_z$— where x+y+z is 20 or more, but 40,000 or less, p and q are independently 0.01 or more, but 0.99 or less, p+q is 1, b represents a block structure, and r represents a random structure.

The ABC type block polymer of the sixth aspect corresponds to the ABC type block polymer among the block polymers explained in connection with the aforementioned first aspect. In addition to the description of the ABC type block polymer, therefore, the explanation for the ABC type block polymer offered in connection with the first aspect will be referred to for a description of the ABC type block polymer of the sixth aspect.

EXAMPLES

The present invention will be described in detail by Examples, but is not limited thereto.

Example 1

<Synthesis of Polymer>

Preparation of Monomers

2-Methoxyethyl vinyl ether (hereinafter referred to as MOVE) and 2-ethoxyethyl vinyl ether (hereinafter referred to as EOVE) were synthesized by refluxing 2-chloroethyl vinyl ether and sodium methoxide and sodium ethoxide, respectively, with the use of a tetrabutylammonium iodide catalyst (H. J. Schneider, U.S. Pat. No. 3,062,892 (1962)).

Synthesis of ABC Block Polymer (II-g, x=y=z=160, p=q=0.5:

The interior of a glass container fitted with a three-way stopcock was purged with nitrogen, and then heated at 250° C. under a nitrogen gas atmosphere to remove adsorption water. After the temperature of the system was returned to room temperature, 16 mmols of EOVE, 25 mmols of ethyl acetate, 0.1 mmol of 1-isobutoxyethyl acetate, and 11 ml of toluene were added. When the temperature inside the system reached 0° C., 0.5 mmol of ethylaluminum sesquichloride was added to initiate polymerization, thereby synthesizing an A component of an ABC block polymer. The molecular weight was monitored by Gel permeation chromatography (GPC) in a time-shared manner. After polymerization of the A component was completed, polymerization of a B component was carried out with the simultaneous addition of 8 mmols each of the B component EOVE and MOVE. Then, the molecular weight was monitored by GPC in a time-shared manner. After polymerization of the B component was completed, 16 mmols of a C component, MOVE, was added to polymerize the C component. Termination of the polymerization reaction was performed by adding 0.3 wt. % of an ammonia/methanol solution into the system. Dichloromethane was added to the solution of the mixture after completion of the reaction to dilute it. The diluted mixture was washed three times with a 0.6N hydrochloric acid solution, and then three times with distilled water, concentrated to dryness by an evaporator to give a residue. The residue was dried in vacuo to give a triblock polymer, the desired product. The compound was identified by NMR and GPC (Mn=4.8×10$^4$, Mn/Mw=1.4 (calculated as polystyrene)).

If the B component and the C component are not added during the synthesis of the polymer, the following homopolymer composed of EOVE can be synthesized:

—[CH$_2$—CH(OCH$_2$CH$_2$O—C$_2$H$_5$)]$_{160}$—

Unless the C component is added, the following diblock polymer comprising EOVE and a copolymer of EOVE and MOVE can be synthesized:

—[CH$_2$—CH(OCH$_2$CH$_2$—OCH$_3$)]$_{160}$-b-{[CH$_2$—CH
(OCH$_2$CH$_2$—OC$_2$H$_5$)]$_{0.5}$-r-[CH$_2$—CH
(OCH$_2$CH$_2$—OCH$_3$)]$_{0.5}$}$_{160}$—

If the conversion of the monomer to the polymer is terminated halfway, the polymer with a different chain length can be obtained. At the time of the synthesis described above, not only a triblock polymer (II-g, x=y=z=120, p=q=0.5), but also the compounds described in the following formulae (i) to (iii) were synthesized:

—[CH$_2$—CH(OCH$_2$CH$_2$O—C2H$_5$)]$_x$-(x=10, 60 or 120)  Formula(i)

—[CH$_2$—CH(OCH$_2$CH$_2$—OCH$_3$)]$_x$-b-{[CH$_2$—CH
(OCH$_2$CH$_2$—OC$_2$H$_5$)]$_{0.5}$-r-[CH$_2$—CH
(OCH$_2$CH$_2$—OCH$_3$)]$_{0.5}$}$_y$—(x=160, y=60, 80 or 120)  Formula(ii)

—[CH$_2$—CH(OCH$_2$CH$_2$—OCH$_3$)]$_x$-b-{[CH$_2$—CH
(OCH$_2$CH$_2$—OC$_2$H$_5$)]$_{0.5}$-r-[CH$_2$—CH
(OCH$_2$CH$_2$—OCH$_3$)]$_{0.5}$}$_y$-b-[CH$_2$—CH
(OCH$_2$CH$_2$—OC$_2$H$_5$)]$_z$(x=160, y=160, z=20, 80, 120)—  Formula(iii)

Furthermore, polymers having various degrees of polymerization can be synthesized by increasing or decreasing the amount of the monomer added. Besides, various polymers (II-a, b, c, d, e, h, i, j, k, and l) can be synthesized in the same manner by employing the above-described method and changing the monomer structure.

<Preparation of Pigment Dispersion Ink>

3 Parts by weight of a pigment (MOGUL-L, Cabbot), 5 parts by weight of the above-mentioned block polymer, and 3 parts by weight of diethylene glycol were added to 89 parts by weight of ion-exchanged water. The mixture was heated to 50° C., and dispersed using an ultrasonic homogenizer. The dispersion was filtered under pressure through a 1 μm filter to prepare a stimuli-responsive ink.

<Bulk Characteristics of Ink>

The DSC of the above ink was measured, and peaks of phase transition of the block polymer were observed at 18° C., 38° C. and 67° C. These peaks were suggested to correspond, respectively, to a phase transition in which the EOVE block changes from hydrophilic to hydrophobic, a phase transition in which the MOVE-EOVE random polymerization block changes from hydrophilic to hydrophobic, and a phase transition in which the MOVE block changes from hydrophilic to hydrophobic.

The same composition prepared with the exclusion of the pigment was observed at different temperatures. At temperatures in excess of 67° C., a suspension of the insolubilized polymer was observed. At temperatures between 38° C. and 67° C., the polymer dispersed as a micelle in the liquid and appeared transparent. At temperatures between 38° C. and 18° C., a marked increase in viscosity probably due to an increase in micelle interaction was observed. The composition with a block polymer concentration of 18 wt. % was prepared, and the above temperature process was repeated. At temperatures between 38° C. and 18° C., an even more marked increase in viscosity occurred, resulting in gel.

Particle size measurements were made using a dynamic light scattering measuring device (Otsuka Denshi). At 60° C., the micelle particle size, as the average particle size (diameter), was 50 nm. At 50° C., the micelle particle size, as the average particle size (diameter), was 61 nm. This particle size changed to 153 nm at 27° C.

Comparative Example 1

An ink composition was prepared by mixing 15 wt. % of a self-dispersible pigment (CAB-O-JET300, Cabbot), 0.5 wt. % of a surface active agent (NONION E-230, NOF CORP.), 10 wt. % of ethylene glycol, and 74.5 wt. % of ion-exchanged water.

Example 2

<Printing Test>

The ink-jet inks for an ink-jet process, prepared in Example 1 and Comparative Example 1, were evaluated for fixing strength. The ink-jet inks of Example 1 and Comparative Example 1 were each charged into a recording head of a bubble jet (registered trademark) printer (trade name: BJF800) of CANON INC., and recorded onto a sheet of plain paper with the use of the ink-jet printer.

Evaluations were made by pressing another blank sheet of plain paper, 30 seconds after recording, against the printed area under a load of $4.9 \times 10^4$ N/m², and observing whether or not the ink adhered to the blank sheet of plain paper.

The above printer was installed in a space kept at 42° C., and the ink composition of Example 1 set at 55° C. was introduced into the ink tank. Immediately thereafter, the ink composition was recorded onto a sheet of plain paper, and the recorded sheet was immediately withdrawn at room temperature. Thirty seconds after recording, another blank sheet of plain paper was pressed against the printed area under a load of $4.9 \times 10^4$ N/m², and it was observed whether or not the ink adhered to the blank sheet of plain paper. No adhesion was observed. The same experiments were conducted using the ink of Comparative Example 1, and adhesion of a black color was observed.

Example 3

A sheet of plain paper, a recording medium, was sprayed with a 5 wt. % aqueous solution of polyacrylic acid (pH 4) to prepare a recording medium capable of giving stimuli. Ink-jet recording was performed on this recording medium in the same manner as in Example 2. Satisfactory fixing properties similar to those in Example 2 were achieved. The block polymer of Example 1 is known to form a complex with a carboxylic acid. Thus, it is speculated that the interaction of this polymer with the recording medium, in addition to the temperature-associated property change of Example 2, contributed to achieve the satisfactory fixing properties.

Example 4

Two panes of transparent glass were provided, and an aqueous dispersion composition of 15 wt. % of the block polymer synthesized in Example 1 and 3 wt. % of MOGUL-L (Cabbot) (water dispersion compsition) was placed on one of the panes. A structural adhesive was applied so as to surround the region where the composition was placed. The other pane of transparent glass was contacted under pressure with the former pane to encapsulate the sample composition. The resulting cell was subjected to a cycle of a temperature rise and a temperature fall between 50° C. and 80° C. At a temperature exceeding 67° C., an opaque state involving a suspension of the insolubilized polymer was observed. At a temperature between 38° C. and 67° C., a state in which the insolubilized polymer dispersed as a micelle in the liquid to become transparent was observed. Hence, an optical element or device capable of controlling transmittance in response to a temperature change can be realized.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ABC block polymer compound, wherein each of the blocks makes a phase transition from solvophobic to solvophilic or from solvophilic to solvophobic by temperature change, and a transition temperature at which the phase transition occurs is the lowest in A block and the highest in C block.

2. The ABC type block polymer compound according to claim 1, wherein the phase transition is one which changes from solvophilic to solvophobic by increase of temperature.

* * * * *